May 28, 1929.  A. HUDSON  1,714,672
CURRENT CONTROLLING MECHANISM FOR AUTOMOBILE SIGNALS
Filed Dec. 1, 1927   3 Sheets-Sheet 3

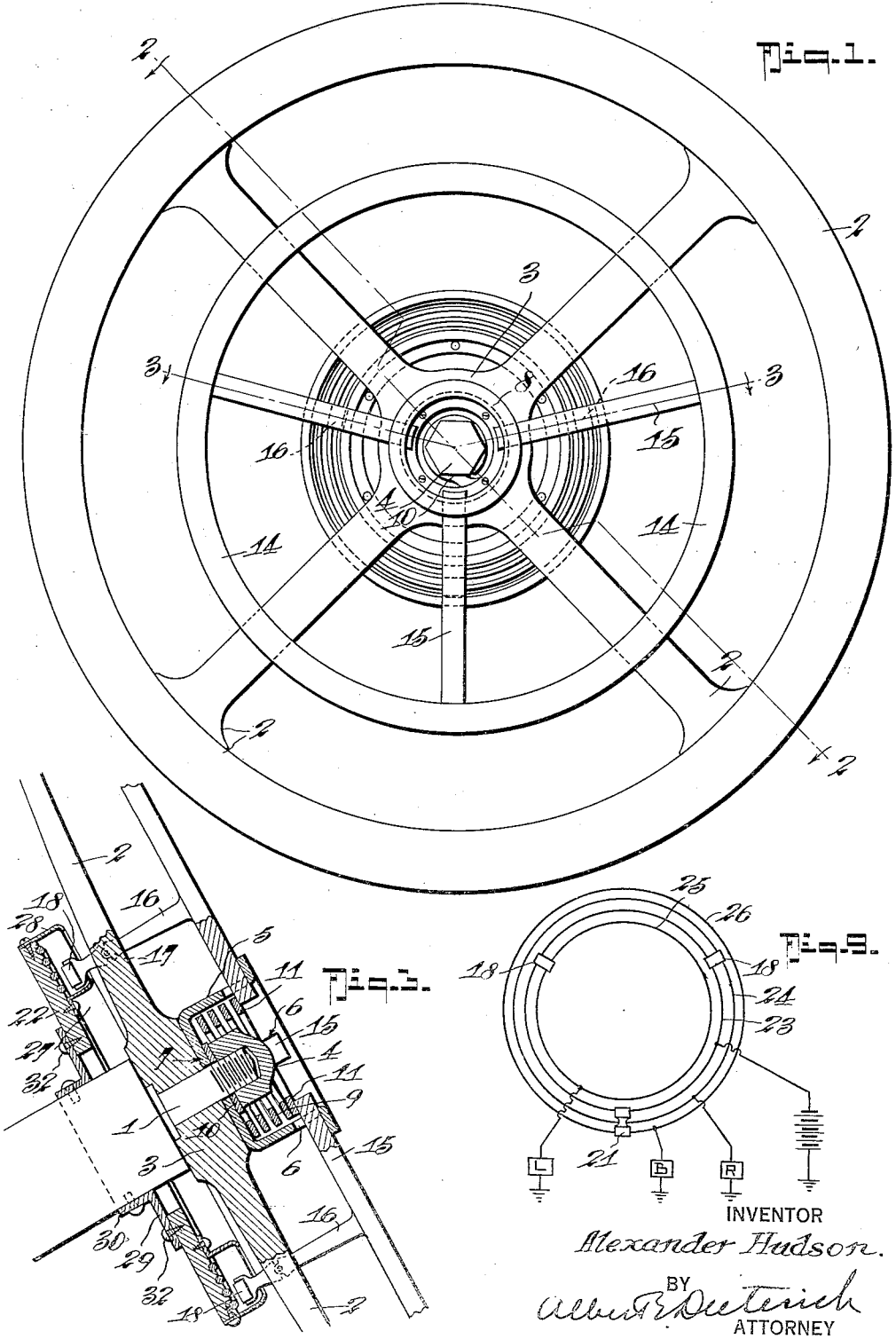

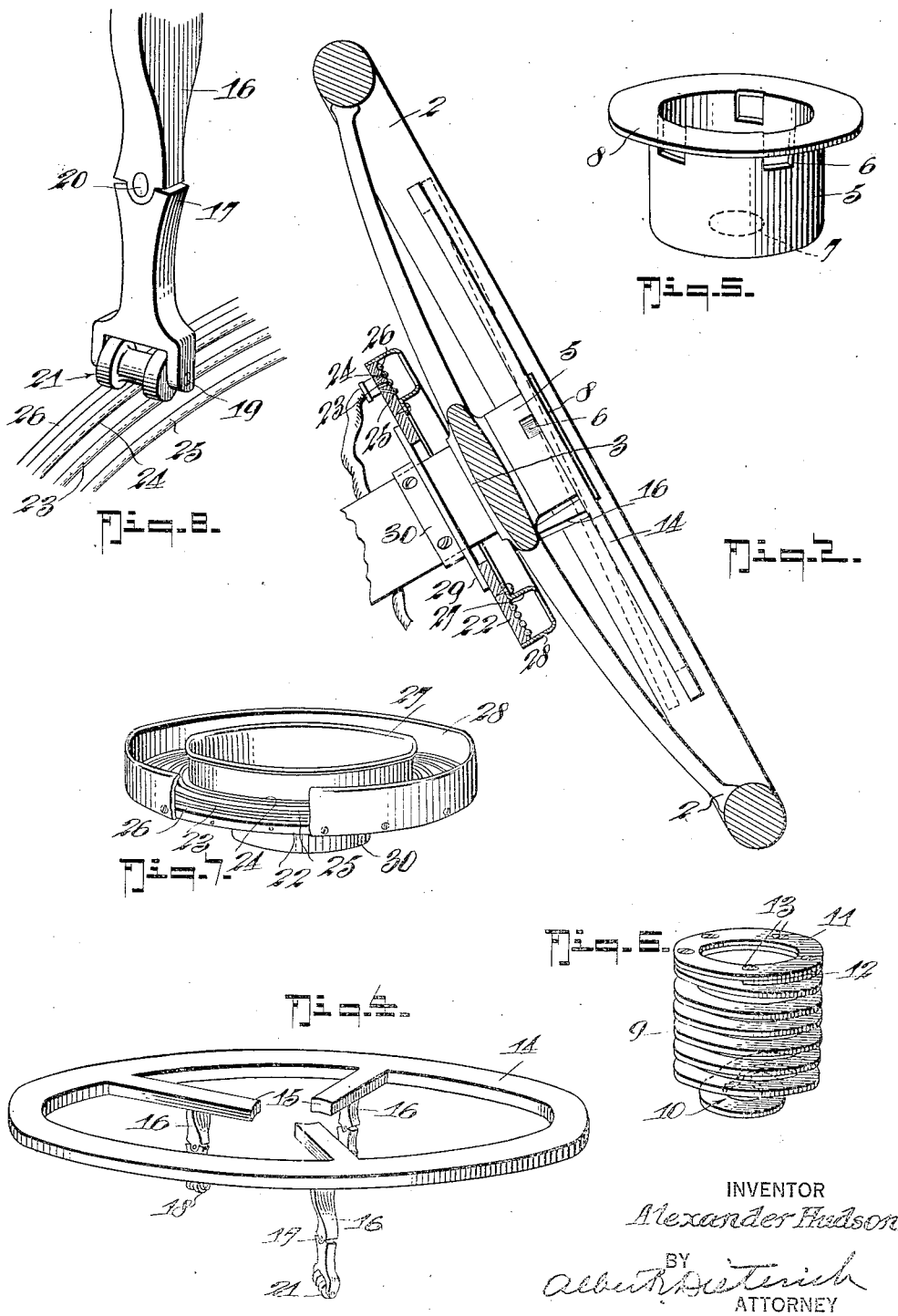

INVENTOR
Alexander Hudson.
BY
ATTORNEY

Patented May 28, 1929.

1,714,672

UNITED STATES PATENT OFFICE.

ALEXANDER HUDSON, OF ROUND LAKE, MINNESOTA.

CURRENT-CONTROLLING MECHANISM FOR AUTOMOBILE SIGNALS.

Application filed December 1, 1927. Serial No. 237,105.

My invention relates to the art of electric signalling and more particularly to electrically operated signals for indicating right and left turns and backing of motor vehicles in order to warn other approaching vehicles.

Primarily my invention has for an object to provide an improved and simplified means located upon the steering shaft and the steering wheel and steering post for closing, properly, the circuit connections of the respective signals without the necessity of the operator removing his hands from the wheel.

Another object is to provide a circuit controller that can be mounted directly on the steering shaft against the steering wheel hub by means of the clamp nut that holds the steering wheel in place.

Further it is an object to provide a device of the kind referred to, that can be manufactured at low cost, one that is neat in appearance and one that can be associated with the steering wheel mechanism by an ordinary mechanic, requiring the use of no special tools for its placement, or particular mechanical knowledge in the one putting it on.

Other objects will in part be obvious and in part be pointed out hereinafter.

To the attainment of the aforesaid objects and ends, my invention consists in the novel details of construction and in the combination, connection and arrangement of parts, hereinafter more fully described and then pointed out in the claims.

In the drawings:

Figure 1 is a plan view of the steering wheel with the invention applied.

Figure 2 is a section on the line 2—2 of Figure 1.

Figure 3 is an enlarged detail section on the line 3—3 of Figure 1.

Figure 4 is a perspective view of the operating ring.

Figure 5 is a perspective view of the mounting cup.

Figure 6 is a perspective view of the spring and its spoke engaging annulus.

Figure 7 is a perspective view of the fixed element of the distributor unit.

Figure 8 is an enlarged detail view of one of the contact making arms showing its knee joint and a contact roller such as is used on the "back" unit.

Figure 9 is a diagrammatic view of the central elements between the distributor, contact rings, the signals and battery.

Figure 10:
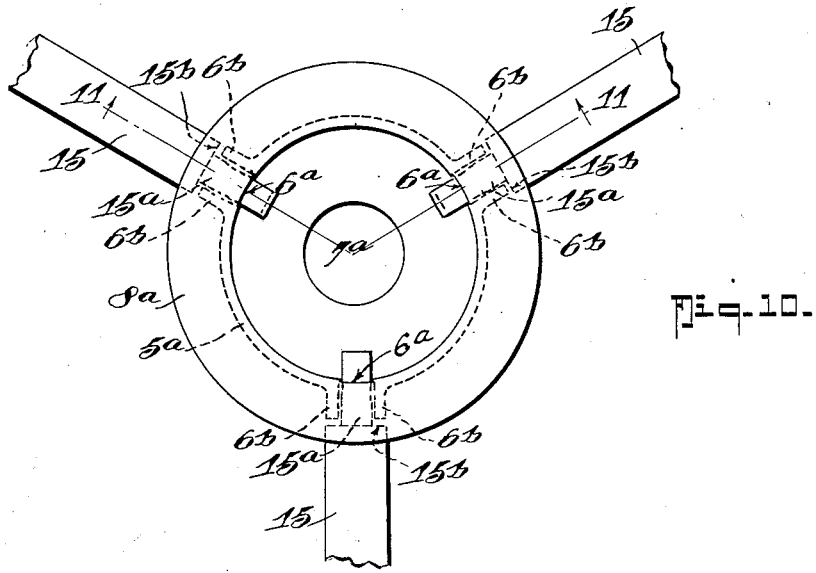
Figure 10 is a plan view of the slightly modified form of mounting cup.

In the drawings, in which like numerals of reference indicate like parts in all the figures, 1 represents the steering wheel shaft, the upper end of which is adapted to receive the steering wheel hub 3 and a suitable clamp nut 4 for holding the steering wheel in place. 2 designates the steering wheel in its entirety.

5 is a mounting cup which has slots 6 for the reception of the spokes 15 of the operating ring 14. It also has an opening 7 to fit on the shaft 1 and is adapted to have its bottom rest against the hub 3 of the steering wheel and be secured thereto by the clamp nut 4 in a manner presently to be explained.

The spokes 15 are prevented from moving outwardly away from the steering wheel beyond a limited distance by means of the flange 8 on the cup 5. They are held against this flange yieldingly by a spring 9, the lower end of which is constricted at 10 to form a washer, as it were, that fits on the shaft 1 and is adapted to be clamped between the nut 4 and the bottom of the cup when the nut 4 is screwed home to hold the parts in proper co-relative position.

At the outer end, the spring 9 is provided with a pressing ring 11 which is secured to the outer end 12 of the spring by means of suitable fastening screws 13, the spring being preferably of flat coils.

14 designates the operating ring whose spokes 15 have heretofore been referred to. Secured rigidly to certain of the spokes 15 are circuit closing legs 16 (one for the right turn, one for the left turn, and one for the backing signal, if the backing signal is to be employed). Each of these legs 16 is articulated and provided with a knee joint 17, giving a slight movement at the joint in order that the contact roller 18, which is carried by the leg, may fit its seat against the proper contact rings of the distributer. 19 is the axis on which the contact roller is mounted, which axis, it will be observed, is at right angles to the axis 20 of the knee joint.

The contact rollers for the right and left turns are indicated by 18 as they are of the same construction, but the contact roller for the "back" signal is indicated at 21 since it is composed of two contacting portions with a reduced portion between. This is done in order that the roller may contact the proper contact rings only of the distributer.

The distributer consists of an insulation ring 22 on which is mounted the metallic contact rings 23, 24, 25 and 26 respectively. One of these contact rings (say 23) is connected to the battery while the other contact rings 24, 25 and 26 are electrically connected with the proper right and left hand and backing signals, which signals are in turn connected with the battery either by grounding the battery and the signals or by wired connections in the usual way.

As the circuit connections from the distributer rings to the battery and signals are of well known type a mere diagrammatic view has been provided to indicate the same, see Figure 9.

For protection I provide an inner guard 27 and an outer guard 28 on the ring 22, the legs 16 passing between the outer and inner guards.

29 designates a plate for holding the distributer ring, the plate 29 being provided with a collar 30 by which it is attached to the steering wheel column and does not turn.

The ring 22 is secured to the ring 29 by suitable screws 32 as shown.

In the diagrammatic view, Figure 9, the right signal is indicated by the reference character R, the left signal by the reference character L, the back signal by the reference character B. The battery and circuit connections are conventionally indicated and therefore do not require special reference designations.

In operating my apparatus the user simply presses down on the operating ring 14 with his thumb or finger, using the left hand thumb for the left turn operation and the right hand thumb for the right hand operation and either hand for the backing operation. Instead of maniplating the ring 14 in the way just stated the operator can, of course, manipulate it in any other way that may be convenient to him.

It is quite obvious that the elevation contour or shape of the ring 14 may be modified to adapt it to conform to the elevation contour of the spokes of the steering wheel. In the drawings the invention has been shown as attached to cooperate with a dished steering wheel while, when it is to cooperate with a crowned steering wheel, it will be shaped accordingly. This being an obvious mechanical matter involving in itself no invention, illustration thereof is thought to be unnecessary.

Figure 11:
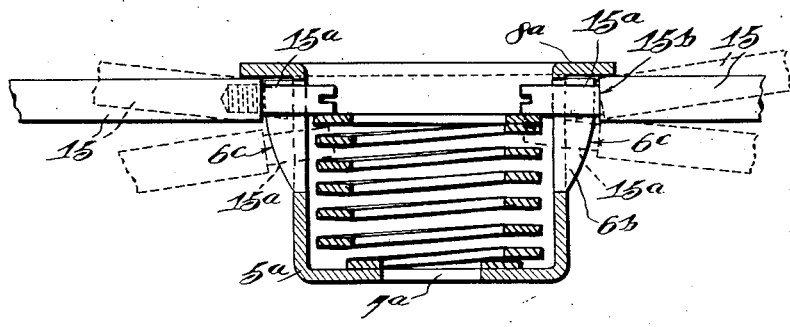
Figure 11 is a vertical cross section taken on the line 11—11 of Figure 10.
Figure 12:
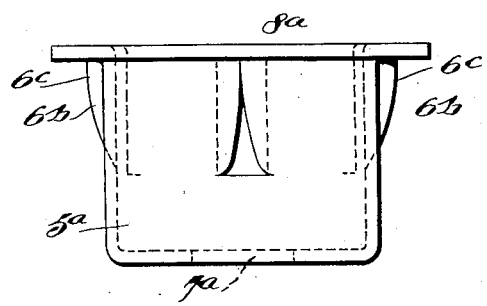
Figure 12 is a side elevation of the mounting cup shown in Figure 10.

In Figures 10, 11 and 12 I have disclosed a modified form of mounting cup in which means is provided for facilitating the mounting of the operating ring spokes in the said cup and for assuring proper operation of the said ring on the said cup. In the figures mentioned the parts of the cup which are similar in construction to those hereinbefore described are given their original reference numerals with the index letter "a" added thereto. Thus the cup is designated $5^a$, the slots $6^a$, the mounting aperture $7^a$ and the flange $8^a$.

In this modified form the operating ring spokes 15 are each equipped with a radially inwardly projecting trunnion portion $15^a$ and the mounting cup slots $6^a$ are flanked by guiding flanges $6^b$ which may be bent outwardly from the metal removed to form the said slots as is indicated in the center of Figure 12. The extended edges of the flanges $6^b$ are curved at $6^c$ to conform to the path of movement of the spokes as the ring is manipulated, the said curved edges serving to hold the ring centered and to assure smooth movement of the ring by engagement of the trunnions $15^a$ with the opposed faces of the flanges and the engagement of the spokes' shoulders $15^b$ with the said curved edges of the flanges.

From the foregoing description, taken in connection with the accompanying drawings, it is thought the complete construction, operation and advantages of my invention will be clear to those skilled in the art to which it relates.

What I claim is:

1. In apparatus of the class described wherein is provided a steering wheel post, a steering wheel shaft, a steering wheel on the shaft, and a distributer member mounted on the post beneath the wheel; a circuit controlling device comprising a ring with spokes, means mounting said ring on the steering wheel shaft to turn with the steering wheel, said device including circuit closing legs, associated with said distributer, and means continuously tending to hold said ring in a position to retain said legs inactive.

2. In apparatus of the class described wherein is provided a steering wheel post, a steering wheel shaft, a steering wheel on the shaft, and a distributer member mounted on the post beneath the wheel; a circuit controlling device comprising a ring with spokes, means mounting said ring on the steering wheel shaft to turn with the steering wheel, said device including circuit closing legs associated with said distributer, and means continuously tending to hold said ring in a position to retain said legs inactive, said mounting means including a slotted cup having a flange, said spokes projecting through the slots in said cup and resting against said flange, said holding means comprising a spring, pressing said spokes toward said flange.

3. In apparatus of the class described wherein is provided a steering wheel post, a steering wheel shaft, a steering wheel on the shaft, and a distributer member mounted on the post beneath the wheel; a circuit controlling device comprising a ring with spokes; a cup having an apertured bottom to fit on the steering wheel shaft and lying against the steering wheel's hub, said cup having a flange at its mouth and having slots in its sides through which the spokes of said ring project, a spring within said cup to press said spokes toward said flange, said spring having a constricted end at the bottom of the cup, a nut on the steering wheel shaft to engage and clamp said constricted end and the bottom of the cup against the steering wheel's hub to secure the spring and hub in place, all being arranged substantially as shown and described.

4. In apparatus of the class described wherein is provided a steering wheel post, a steering wheel shaft, a steering wheel on the shaft, and a distributer member mounted on the post beneath the wheel; a circuit controlling device comprising a ring with spokes, a cup having an apertured bottom to fit on the steering wheel shaft and lying against the steering wheel's hub, said cup having a flange at its mouth and having slots in its sides through which the spokes of said ring project, a spring within said cup to press said spokes toward said flange, said spring having a constricted end at the bottom of the cup, a nut on the steering wheel shaft to engage and clamp said constricted end and the bottom of the cup against the steering wheel's hub to secure the spring and hub in place, a ring fastened to the outer end of said spring and engaging said spokes, all being arranged substantially as shown and described.

5. In apparatus of the class described wherein is provided a steering wheel post, a steering wheel shaft, a steering wheel on the shaft, and a distributer member mounted on the post beneath the wheel; a circuit controlling device comprising a ring with spokes, means mounting said ring on the steering wheel shaft to turn with the steering wheel, said device including circuit closing legs associated with said distributer, and means continuously tending to hold said ring in a position to retain said legs inactive, said circuit closing legs comprising knee-jointed members having contact elements at their free ends to cooperate with said distributer for the purposes specified.

6. In apparatus of the class described wherein is provided a steering wheel post, a steering wheel shaft, a steering wheel on the shaft, and a distributer member mounted on the post beneath the wheel; a circuit controlling device comprising a ring with spokes, means mounting said ring on the steering wheel shaft to turn with the steering wheel, said device including circuit closing legs associated with said distributer, and means continuously tending to hold said ring in a position to retain said legs inactive, said mounting means including a slotted cup having a flange, said holding means comprising a spring, pressing said spokes toward said flange, said cup slots being flanked by opposed outwardly extended flanges having their outer edges curved to conform substantially to the path of movement of the spoke ends, said spokes having trunnion members projecting from the ends thereof and movable in the cup slots between the extended flanges and providing flange edge engaging shoulders for the purpose specified.

ALEXANDER HUDSON.